June 17, 1930.   H. K. JENSEN   1,764,079
DRINK MIXING DEVICE
Filed June 30, 1928

INVENTOR:
Henry K. Jensen
BY David E. Carlsen
ATTORNEY.

Patented June 17, 1930

1,764,079

UNITED STATES PATENT OFFICE

HENRY K. JENSEN, OF ST. PAUL, MINNESOTA

DRINK-MIXING DEVICE

Application filed June 30, 1928. Serial No. 289,541.

This invention relates to a new and useful device for stirring and mixing liquids preparatory for use in a kitchen or for direct use in preparing various kinds of drinks. For the latter purpose motor driven mixers or stirring devices similar to the means shown in the accompanying drawing are well known and in common use at so called soda fountains, soft drink establishments, cafés etc. This device, as implied, includes the use of a small electric motor with an extended shaft having a suitable stirring device adapted to be submerged in the liquid to be prepared. An object of the invention is to provide a simple, efficient and portable device of the class described and which is readily attached to a tray or other serving device, as hereinafter fully described and illustrated in the drawing, in which,—

Figure 1:
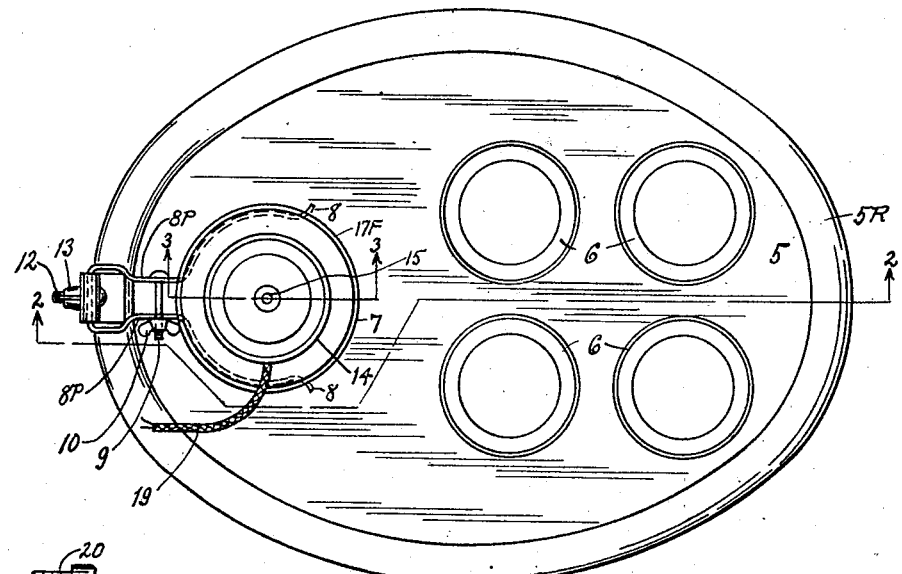
Fig. 1 is a top view of my device mounted on a serving tray.

Referring to the drawing by reference numerals I have illustrated my portable device removably attached to a tray 5 on which are a number of water glasses or tumblers 6. 7 is a mixing receptacle preferably of metal and flared upwardly to its open end, said receptacle being shown on the tray near the rim 5R.

8 is a flat bar spring-metal clip held in a horizontal plane by a vertical clamp device presently to be described, said clip member comprising two opposite curved spring jaws flared outwardly at their ends and in spaced relation to each other.

These jaws comprise the means for frictionally engaging the sides of the receptacle 7 and outwardly of the jaw parts they are extended parallel to each other, as 8P, thence extending horizontally and transversely through and retained in flat loop 11L at the upper end of the vertical clamp member. The parallel parts 8P may be engaged by an adjustment screw 9 having a wing nut 10 to regulate the distance between the opposite jaws and vary the frictional contact on the receptacle 7. The latter may be removed from between the jaws or inserted therebetween by simply pulling or pushing the receptacle out of or into place, between the ends of the jaw members.

The loop 11L just described comprises the upper end of a vertical two-armed clamp 11 preferably made of flat spring-bar, the arms extending downwardly and suitably formed at their terminal to be clamped on the rim 5R of a tray or similar article by means of an adjusting bolt 12 and wing nut 13, it being understood of course that said arms normally are sprung away from each other.

14 is a suitable small motor and casing and having a downwardly directed shaft 15 to which may be removably secured any suitable type of rotary "dasher" head 16 which in use is centrally within the receptacle 7 (see Fig. 2). 17 is a bell-like housing to the upper and closed end of which is centrally fixed a motor, the lower end of said housing comprising a downwardly opening perimetrical flange of a size to snugly fit on the top rim of the receptacle 7. Just above this flanged part 17F the housing is formed with threads 17T of a size to engage the threaded neck 18N of a preserving jar or so called fruit-jar 18 (see Fig. 3). In this instance a housewife may for example stir up, in a fruit jar, a quantity of whipping cream and then leave the whipped cream in the jar until it is to be used. A fruit-jar is of course also easily retained in the spring clamp members 8.

Figures 2, 3:
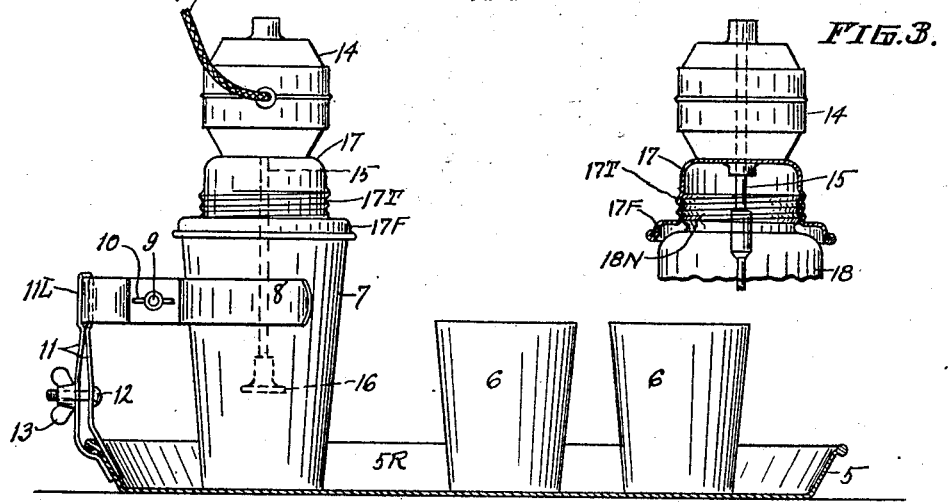
Fig. 2 is longitudinal sectional elevation of Fig. 1 about as on line 2—2 in said latter figure.
Fig. 3 is a side elevation of the upper part of Fig. 2 with the container engaging means shown in centrally sectional elevation about as on line 3—3 in Fig. 1 and engaging the threaded part of a common fruit jar.

In Fig. 1, 19 is the wire-cable to the motor 14 and in Fig. 2, a common electric screw-plug 20 is shown additionally.

As shown in Figs. 1 and 2 it is readily apparent that this device is highly efficient for mixing in the receptacle 7, a quantity of malted milk, lemonade, or any other drinks having two or more ingredients, and after being properly mixed the contents are ready to be poured immediately into the containers 6 on the tray.

I claim:

A holding device for a drink-mixing device of the class described and including a receptacle, and a tray with angular perimetrical flange, said device comprising a horizontal arm having spring jaws adapted to frictionally engage said receptacle, an upright portable member and having means at its top for holding said horizontal arm, said upright member bifurcated below said arm holding means in two downwardly spreading arms, the lower termini of said arms directed angularly corresponding to the angular plane of the tray-flange and adapted to be placed one inside and one outside of said flange, and screw clamp means above said termini to close said arms and their lower extremities to the tray flange as shown and described.

In testimony whereof I affix my signature.

HENRY K. JENSEN.